United States Patent [19]

Fukuda et al.

[11] Patent Number: 4,637,906
[45] Date of Patent: Jan. 20, 1987

[54] METHOD OF PRODUCING CARBON MATERIALS

[75] Inventors: Noriyoshi Fukuda; Ken Nagasawa, both of Chiba, Japan

[73] Assignee: Kawasaki Steel Corporation, Kobe, Japan

[21] Appl. No.: 713,865

[22] Filed: Mar. 20, 1985

[30] Foreign Application Priority Data

Mar. 26, 1984 [JP] Japan .................................. 59-57892

[51] Int. Cl.[4] ............................................. C01B 31/02
[52] U.S. Cl. ..................................... 264/29.1; 208/22; 208/44; 208/45; 264/29.7; 423/445; 423/448
[58] Field of Search .......................... 264/29.1, 29.7; 423/445, 448; 208/44, 45, 22

[56] References Cited

U.S. PATENT DOCUMENTS

| 3,035,308 | 5/1962 | Ragoss et al. | 264/29.7 |
| 4,071,604 | 1/1978 | Schwemer | 264/29.7 |
| 4,080,283 | 3/1978 | Noguchi et al. | 208/22 |
| 4,381,990 | 5/1983 | Noguchi et al. | 208/45 |
| 4,488,957 | 12/1984 | Noguchi et al. | 423/447.2 |
| 4,534,949 | 8/1985 | Glaser et al. | 264/29.7 |

FOREIGN PATENT DOCUMENTS

| 47-43749 | 11/1972 | Japan | 264/29.7 |
| 54-157791 | 12/1979 | Japan | |
| 1220482 | 1/1971 | United Kingdom | 264/29.7 |

Primary Examiner—Jeffery Thurlow
Attorney, Agent, or Firm—Balogh, Osann, Kramer, Dvorak, Genova & Traub

[57] ABSTRACT

A method of producing carbon materials having high density and strength, which method includes starting from a calcined product or its classified product having particular properties obtained by calcining a residue after heat treatment, solvent extraction and filtration of coal tar pitch at 250°–500° C. in an inert gas atmosphere, and then molding, firing and graphitizing it.

1 Claim, 5 Drawing Figures

METHOD OF PRODUCING CARBON MATERIALS

BACKGROUND OF THE INVENTION

1. Field of the Invention

This invention relates to a method of producing carbon materials, and more particularly to a method of producing a high density and high strength carbon material having a bulk density of 1.45-2.05 by starting from a calcined product having a benzene insoluble matter (BI) of more than 95% by weight, a quinoline insoluble matter (QI) of more than 80% by weight and a volatile matter (VM) of 4-15% by weight, which is prepared by subjecting coal tar pitch to heat treatment, solvent extraction, filtration and calcination in this order, or a classified product thereof and then firing and graphitizing it without using a binder.

The carbon materials produced by the invention are utilized for wide applications such as electrodes for steel-making, electric brushes, materials for nuclear reactor, materials for machine and the like because they have various advantages and merits, namely, that they are a good conductor for electricity and heat, are stable at high temperature in a non-oxidizing atmosphere, large in the hot strength, difficult to be attacked by acid, alkali or other chemicals, easy in the machining, excellent in the self-lubrication, and small in the absorption area against thermal neutron and excellent in the slowing-down power.

2. Description of the Prior Art

In general, the carbon materials of this type are produced by mixing filler coke with a binder, molding the mixture, and firing or graphitizing the molded body. However, they are required to have many properties in accordance with the intended use involved and extending over a wide range, (for example, from materials for machine and special electrode materials . . . requiring high density and strength as far as possible . . . to electric brushes requiring relatively low density and strength and a high electrical resistivity).

As a method of producing such carbon materials in accordance with the intended use, it has hitherto been required to take very complicated production steps by changing the kind of the filler coke or the binder (or the mixing ratio of filler coke to binder) or by adding other additives such as natural graphite and the like to the mixture of filler coke and binder. That is, the aforementioned mixing of filler coke and binder complicates the working steps and degrades the working environment. Further, the filler coke itself is porous, while the coal tar pitch or synthetic resin to be used as the binder produces a large amount of pores in the firing. As a result, the above method merely produces carbon materials having a density of about 1.7 g/cm$^3$ and a bending strength of 500-600 kg/cm$^2$ at most, and it is difficult to produce carbon materials having higher density and strength. In addition, since the filler coke usually has an anisotropy, the resulting carbon material has also an anisotropy, so that it is difficult to produce carbon materials having isotropic properties.

Lately with the industrial growth, the demands for higher quality of the carbon material have become severe. As a result, various needs around carbon materials (having an isotropy and high density and strength) are rapidly increasing. In response to such needs, the development of carbon materials having the isotropy and high density and strength is taking place extensively in various fields. In Japanese Patent laid open No. 49-23,791 or Japanese Patent Application Publication No. 51-29,523, for instance, there is proposed a method of producing isotropic high density carbon materials, wherein optically anisotropic mesophase spheres (obtained by heating pitches as a raw material at a temperature of 350°-500° C.) are separated from pitch matrix with a solvent, molded under pressure without a binder, fired and graphitized in the usual manner.

In this conventional method, however, quinoline having a strong extractability is used for the solvent separation of optically anisotropic mesophase spheres, so that pitch fractions are removed from the optically anisotropic mesophase sphere and consequently the binding force of the optically anisotropic mesophase sphere itself is weakened and the high densification thereof is difficult. Furthermore, the fractionation in the solvent separation must be performed by repeatedly using various solvents in addition to quinoline, so that some of low-boiling pitch fraction and solvents are liable to still remain in the resulting optically anisotropic mesophase spheres, and the molded body produced from such mesophase spheres is apt to cause cracking and blistering phenomena resulted from the remaining low-boiling pitch fraction and solvent at the firing step. Therefore, the above prior art has many problems as the industrial production method.

SUMMARY OF THE INVENTION

It is an object of the invention to overcome the aforementioned problems of the prior art.

The inventors have made various studies and found that an isotropic, high density carbon material can stably be obtained by the use of a product obtained by leaving a quinoline soluble but benzene insoluble matter, i.e. β-component as a binder component together with optically anisotropic mesophase spheres in the solvent extraction and then subjecting them to a calcination treatment at 250°-500° C. in an inert gas atmosphere. That is, the β-component as a binder reinforcement is first left in the optically anisotropic mesophase spheres by using a tar middle oil, a gas oil or the like having an extractability smaller than that of quinoline in the solvent extraction step. However, the β-component produces a large amount of volatile matter at the firing step in the production of carbon materials as it is, resulting in the cracking and blistering of the resulting molded body, so that it is subjected to a subsequent calcination treatment at 250°-500° C. in an inert gas atmosphere. In the calcination treatment, the solvent or low-boiling pitch fraction remaining in the optically anisotropic mesophase spheres in the solvent extraction is removed by evaporation, while a part of the β-component is subjected to quinoline insolubilization reaction (QI reaction). The QI produced from the β-component still holds a high binding ability by selecting a proper calcining temperature as compared with QI produced in the heat treatment, so that it is effective for the production of carbon materials having high density and strength without causing the cracking and blistering at the firing step of the molded body. Furthermore, many kinds of solvents are not necessary to be largely used in the solvent extraction step, and the object of the invention can sufficiently be achieved by repeating the extraction operation with a single solvent two times at most. In brief, the inventors have confirmed that the carbon materials can stably be produced when the calcined product satisfies BI>95% by weight, QI>80% by weight and VM=4-15% by weight.

According to the invention, even when finely dividing a calcined product of bulk mesophase formed from the optically anisotropic mesophase spheres in the further heat treatment of pitch, it is possible to produce isotropic, high density carbon materials without using a binder. Particularly, according to the invention, carbon materials having such physical properties that a bulk density is 1.4–2.05 g/cm$^3$, a bending strength is 200–1,300 kg/cm$^2$, an electrical resistivity is 800–5,000 Ω·cm and a Shore hardness is 40–95 can industrially and stably be produced by changing a molding pressure so as to provide a given bulk density in accordance with the amount of $\beta$-component in the calcined product or its classified product satisfying BI> 95% by weight, QI>80% by weight and VM=4-15% by weight.

DETAILED DESCRIPTION OF THE INVENTION

Figure 1:
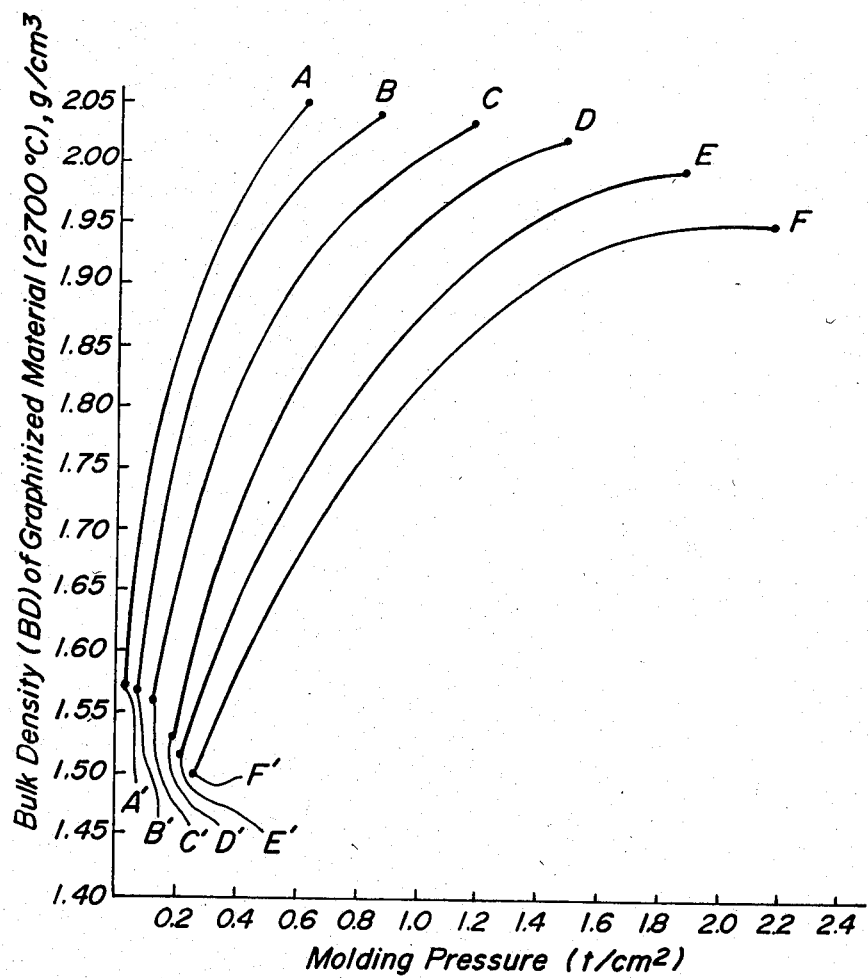
FIG. 1 is a graph showing a relation between the molding pressure and the bulk density of graphitized material.

As a starting material for carbon materials according to the invention, there are used calcined products having BI>95% by weight, QI>80% by weight and VM=4-15% by weight, which are obtained by heat-treating coal tar pitch at a temperature of 350°–600° C., subjecting the heat-treated pitch to solvent extraction and filtration to obtain an extraction residue having QI<95% by weight and then calcining the residue at a temperature of 250°–500° C. in an inert gas atmosphere, and classified products obtained by classifying the calcined product into desired particle sizes.

In the calcined and classified products, quinoline soluble but benzene insoluble $\beta$-component as a binder component is left in the solvent extraction and filtration steps and then subjected to calcination treatment for preventing the occurrence of cracking and blistering in the subsequent firing of molded body. Therefore, carbon materials can be produced by molding, firing and graphitizing such calcined or classified product without using a binder.

As a result of various investigations, it has been confirmed that the firing and graphitizing properties are largely influenced by the amount of $\beta$-component in the calcined or classified product and the molding pressure. The calcination step is to perform the removal of low-boiling volatile matters and the QI reaction of a part of $\beta$-component for preventing the cracking and blistering at the firing of the molded body. In general, as the calcining temperature is raised, the QI reaction of $\beta$-component is accelerated and the amounts of VM and $\beta$-component are reduced. In the calcined and classified products having low amounts of VM and $\beta$-component, therefore, the probability of the occurrence of blistering and cracking at the firing and graphitizing steps after the molding becomes low, while the binding abilities of $\beta$-component and QI produced by the calcination of $\beta$-component decrease to reduce the shrinkage factor of the molded body at the firing and graphitizing steps. On the other hand, in the calcined and classified products having high amounts of VM and $\beta$-component, the probability of the occurrence of blistering and cracking at the firing and graphitizing steps after the molding becomes high, while the binding abilities of $\beta$-component and QI produced by calcination of $\beta$-component are still high, which shows a tendency of increasing the shrinkage factor of the molded body at the firing and graphitizing steps.

As a result of further studies on the properties of the calcined and classified products, it has been found that the amount of $\beta$-component contained in the calcined or classified product to be used in the invention and the molding pressure largely contribute to the properties of the resulting carbon material. That is, the relation of the molding pressure to the density and strength of the graphitized carbon material is varied in accordance with the amount of $\beta$-component in the calcined or classified product. For instance, when the molding pressure is the same, the calcined and classified products having a large amount of $\beta$-component provide carbon materials having higher density and strength, while the calcined and classified products having a small amount of $\beta$-component provide carbon materials having relatively low density and strength. On the other hand, when using the calcined or classified product having the small amount of $\beta$-component, even if the molding is carried out at a pressure higher than that in the calcined or classified product having the large amount of $\beta$-component, the production of carbon material is possible without causing the blistering and cracking at the firing step.

In FIG. 1 is shown a relation between the molding pressure (t/cm$^2$) and the bulk density of the graphitized carbon material, wherein curves AA', BB', CC', DD', EE' and FF' correspond to the use of classified products having the amounts of $\beta$-component of 15% by weight, 13% by weight, 9% by weight, 4% by weight, 1.5% by weight and 0% by weight, respectively.

In FIG. 1, points A, B, C, D, E and F show maximum molding pressures for the stable production of carbon material in accordance with the amount of $\beta$-component, respectively, while points A', B', C', D', E' and F' show minimum molding pressures for molding without a binder in accordance with the amount of $\beta$-component, respectively.

As seen from FIG. 1, if the molding pressure is the same, the bulk density of the carbon material increases as the amount of $\beta$-component increases, while the molding pressure for the stable production of carbon material becomes larger as the amount of $\beta$-component decreases. Therefore, carbon materials having a desired bulk density can be produced by selecting the molding pressure in accordance with the amount of $\beta$-component contained in the calcined or classified product.

When the amount of $\beta$-component in the calcined and classified products is the same, the bulk density of the carbon material is somewhat influenced by QI in coal tar pitch, QI after heat treatment of coal tar pitch and amount of β-component after extraction and filtration.

Figure 2:
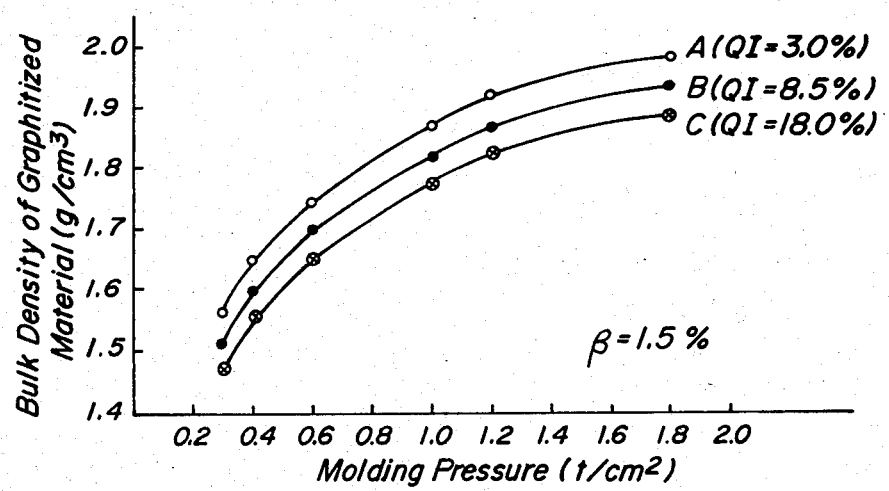
FIG. 2 is a graph showing an influence of QI in coal tar pitch on the bulk density of the carbon material produced from the classified product ($\beta=1.5\%$)
Figure 3:
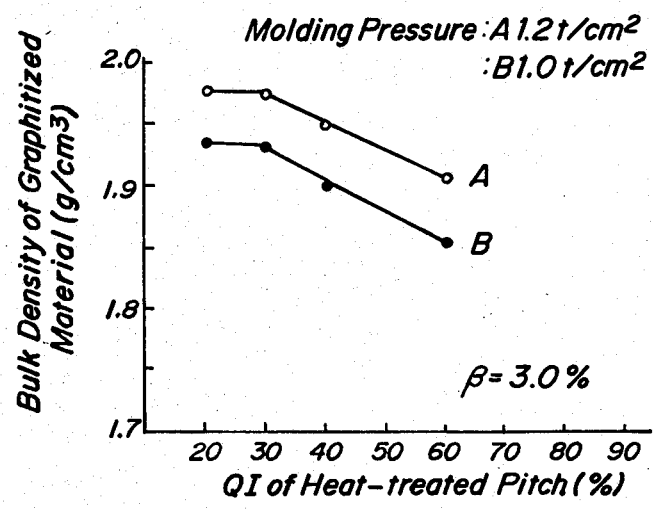
FIG. 3 is a graph showing an influence of QI in heat-treated pitch on the bulk density of the carbon material produced from the classified product ($\beta=3\%$)
Figure 4:
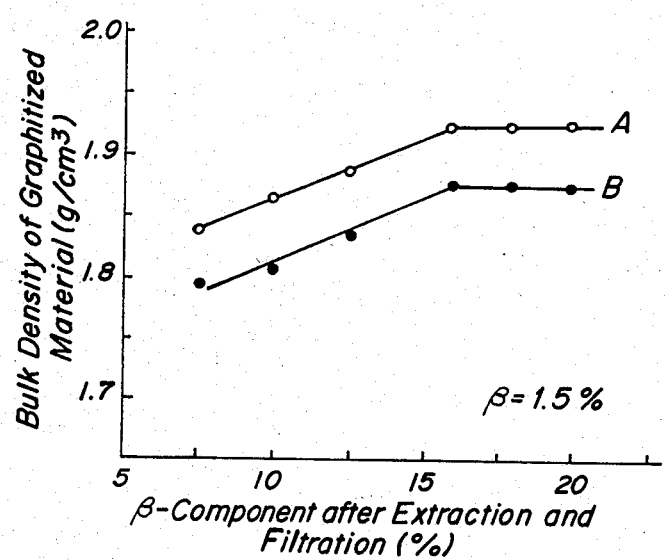
FIG. 4 is a graph showing an influence of amount of $\beta$-component after extraction and filtration on the bulk density of the carbon material produced from the classified product ($\beta=1.5\%$)
Figure 5:
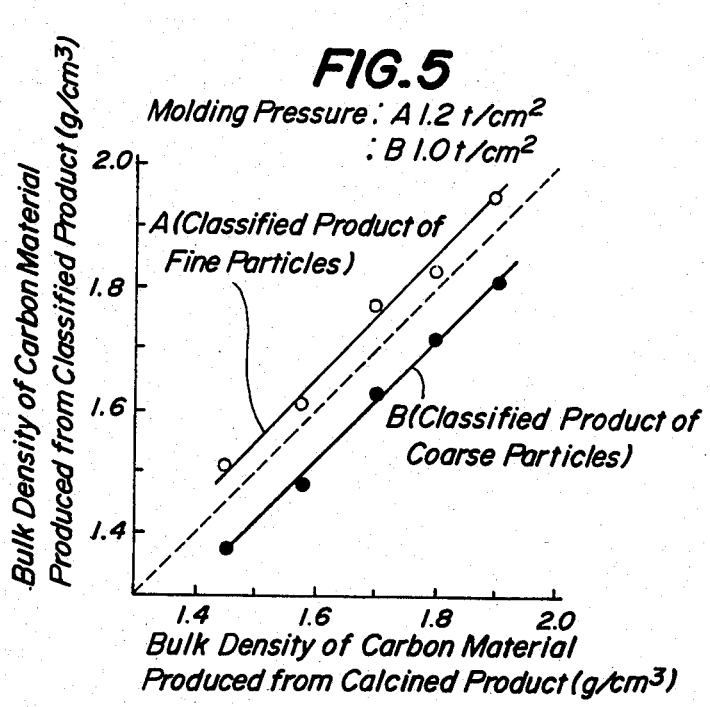
FIG. 5 is a graph showing the influence of classification treatment of a calcined product on the bulk density of the carbon material.

In FIGS. 2-4 are shown influences of QI in coal tar pitch, QI in heat-treated pitch and amount of β-component after extraction and filtration on the bulk density of the carbon material when other conditions are the same, respectively. In FIG. 5 is further shown an influence of classification treatment for classified products obtained from the calcined product, i.e. classified product consisting mainly of finely divided particles and classified product consisting mainly of coarse particles.

In the embodiment of FIG. 1 is used a classified product prepared by starting from coal tar pitch having QI=3.0% so as to obtain QI after heat treatment of 30% and amount of β-component after extraction and filtration of 20%. Therefore, it is apparent that the absolute value of bulk density in FIG. 1 varies in accordance with the relations of FIGS. 2-5. As a result, carbon materials having an arbitrary bulk density can be produced by selecting the molding pressure based on the amount of β-component in the calcined or classified product in view of the relations of FIGS. 2-5.

Moreover, the properties of carbon materials produced from the calcined and classified products are determined by the bulk density of the resulting carbon material. In the carbon material, the bulk density is positively related to each of bending strength and Shore hardness, and is negatively related to electrical resistivity, so that the determination of bulk density substantially determines other properties.

For instance, the classified product of FIG. 1 has the following relations:

$$Bs = 2030 BD - 2900,$$

$$\rho = -4650 \times BD + 10480, \text{ and}$$

$$Hs = 91 \times BD - 90.5$$

, wherein BD is a bulk density (g/cm³), Bs is a bending strength (kg/cm²), ρ is an electrical resistivity (μΩ·cm) and Hs is a Shore hardness.

When using large QI coal tar pitch, it tends to give a higher electrical resistivity as compared with small QI pitch under the same bulk density, while the electrical resistivity tends to reduce under the same bulk density as QI after the heat treatment becomes higher. On the other hand, the interrelation of the bending strength and Shore hardness to the bulk density is substantially unchanged irrespective of other conditions.

As mentioned above, the relation between the amoung of β-component and the molding pressure in the calcined or classified product as shown in FIG. 1 is obtained by defining QI of raw pitch, QI after heat treatment and amount of β-component after extraction and filtration. Therefore, it is possible to produce carbon materials having desired properties by selecting the molding pressure in accordance with the amount of β-component.

Further, QI of raw pitch, QI after heat treatment and amount of β-component after extraction and filtration can easily be controlled in the course of the production of the calcined and classified products. That is, QI of raw pitch is determined by the kind of pitch to be used, and QI after heat treatment is controlled by heat treating conditions, i.e. time and temperature. Further, the amount of β-component after extraction and filtration is determined by the kind and amount of the solvent used in the extraction. For instance, the carbon material having the following properties:

bulk density (BD) (g/cm³) = 1.45-2.05,
bending strength (Bs) (kg/cm²) = 100-1,300,
electrical resistivity (ρ) (μΩ·cm) = 800-5,000,
Shore hardness (Hs) (°) = 40-95 can be produced by the method according to the invention. The bending strength and Shore hardness are positively related to the bulk density, respectively, and are finally determined by the determination of the bulk density, while the electrical resistivity is negatively related to the bulk density but is also influenced by QI of raw pitch and QI of heat-treated pitch.

In general, if it is intended to obtain carbon materials having high density and strength, when it is difficult to set a high-pressure molding equipment requiring a high equipment cost, it is possible to produce the carbon material even under low pressure by using the calcined product having a large amount of β-component instead of the calcined or classified product having a small amount of β-component. On the other hand, if it is intended to obtain low density carbon materials, the calcined or classified product having the large amount of β-component easily and largely affects the properties of the resulting carbon material even when the molding pressure slightly changes in a region of low molding pressure. Therefore, the use of the calcined or classified product having the small amount of β-component can produce stable carbon materials having a small scattering degree in industry. Such a selection can easily be attained only be selecting the calcining temperature in the production of the calcined product and is very useful.

The following examples are given in the illustration of the invention and are not intended as limitations thereof.

EXAMPLE 1

A coal tar pitch having a softening temperature (R & B method) of 80° C., BI of 20% by weight and QI of 3.6% by weight was heat-treated in a heat treating vessel at a temperature of 445° C. for 10 minutes to obtain a heat-treated pitch having BI of 51.0% by weight and QI of 29.5% by weight. The heat-treated pitch was subjected to a solvent extraction two times repeatedly by using 600 parts by weight of a tar middle oil based on 100 parts by weight of the pitch. The tar middle oil had a boiling point of 140°-270° C. The two extraction operations were carried out at a temperature of 120° C. for 1 hour, respectively.

After the extraction and filtration, the residue had BI of 95.0% by weight, QI of 74.5% by weight and β-component of 20.5% by weight.

Then, the residue was calcined at a temperature of 350° C. to obtain a calcined product having BI of 98.5% by weight, QI of 94.5% by weight, β-component of 4.0% by weight and VM of 8.5% by weight. This calcined product was classified into 85% by weight of fine particles and 15% by weight of coarse particles. Thereafter, each of the calcined product and the classified product of fine particles was molded without a binder. Moreover, the properties of the classified product were the same as in the calcined product. The molding pressure was 0.4 t/cm², 0.6 t/cm², 0.8 t/cm² or 1.0 t/cm² and the size of the molded body was 100 mm (diameter)×100 mm (height).

Then, the molded body was fired and graphitized in the usual manner. The firing was carried out at a temperature of 1,000° C. and a rate of 0.17° C./min. The graphitization was carried out in a Tammanm furnace at a temperature of 2,700° C., wherein the graphitizing rate was 8.3° C./min from room temperature up to 1,000° C. and 5.7° C./min from 1,000° C. up to 2,700° C. The physical properties of the thus graphitized carbon material are shown in the following Table 1.

TABLE 1

| | Calcined product | | | | Classified product | | | |
|---|---|---|---|---|---|---|---|---|
| Molding pressure (t/cm²) | 0.4 | 0.6 | 0.8 | 1.0 | 0.4 | 0.6 | 0.8 | 1.0 |
| Bulk density BD (g/cm³) | 1.63 | 1.78 | 1.85 | 1.90 | 1.73 | 1.82 | 1.90 | 1.94 |
| Bending strength Bs (kg/cm²) | 500 | 730 | 870 | 950 | 620 | 800 | 940 | 1,050 |
| Electrical resistivity ρ (μΩ · cm) | 2,700 | 2,150 | 1,850 | 1,620 | 2,450 | 2,010 | 1,650 | 1,400 |
| Shore hardness Hs | 62 | 71 | 78 | 83 | 67 | 75 | 83 | 86 |

EXAMPLE 2

The same residue as in Example 1 was calcined at a temperature of 320° C. or 400° C. to obtain 320° C. calcined product or 400° C. calcined product. Each of these calcined products was classified into 90% by weight of fine particles and 10% by weight of coarse particles. Then, the 320° C. classified product (fine particles) was molded at a molding pressure of 0.2, 0.4, 0.6 or 0.8 t/cm², while the 400° C. classified product (fine particles) was molded at a molding pressure of 0.4, 0.8, 1.2 or 1.8 t/cm².

The 320° C. classified product had BI of 96.5% by weight, QI of 84.0% by weight, β-component of 12.0% by weight and VM of 10.5% by weight. The 400° C. classified product had BI of 99.0% by weight, QI of 97.5% by weight, β-component of 1.5% by weight and VM of 6.5% by weight. The size of the resulting molded body was the same as in Example 1.

Thereafter, the molded body was subjected to firing and graphitizing treatments under the same conditions as in Example 1. The physical properties of the thus graphitized carbon material are shown in the following Table 2.

TABLE 2

| | 320° C. Classified product (find particles) | | | | 400° C. Classified product (fine particles) | | | |
|---|---|---|---|---|---|---|---|---|
| Molding pressure (t/cm²) | 0.2 | 0.4 | 0.6 | 0.8 | 0.4 | 0.8 | 1.2 | 1.8 |
| Bulk density BD (g/cm³) | 1.76 | 1.91 | 1.96 | 2.02 | 1.64 | 1.81 | 1.92 | 1.97 |
| Bending strength Bs (kg/cm²) | 650 | 980 | 1,080 | 1,180 | 450 | 765 | 980 | 1,100 |
| Electrical resistivity ρ (μΩ · cm) | 2,300 | 1,600 | 1,350 | 1,100 | 2,900 | 2,050 | 1,540 | 1,300 |
| Shore hardness Hs | 70 | 83 | 88 | 93 | 59 | 75 | 83 | 87 |

As mentioned above, according to the invention, carbon materials having high density and strength can surely and easily be produced without causing the cracking and blistering phenomena resulted from low-boiling pitch fraction and solvent.

What is claimed is:

1. A method of producing carbon materials by starting from a calcined product having a benzene insoluble matter of more than 95% by weight, a quinoline insoluble matter of more than 80% by weight and a volatile matter of 4–15% by weight, which is produced by heat-treating coal tar pitch at 350°–600° C., extracting with a solvent, filtering and calcining the resulting residue having a quinoline insoluble matter of less than 95% by weight at a temperature of 250°–500° C. in an inert gas atmosphere, or a classified product obtained by classifying the calcined product into desired particle sizes and then molding, firing and graphitizing it without a binder, the improvement which comprises molding a calcined or classified product having an amount of quinoline soluble and benzene insoluble component of 1.5 to 15% by weight, under a pressure of not more than 1,000 kg/cm² without a binder, so as to obtain a carbon material having a bulk density of 1.85–2.05 g/cm³.

* * * * *